United States Patent [19]

Ely et al.

[11] Patent Number: 4,652,393

[45] Date of Patent: Mar. 24, 1987

[54] COATING REMOVER AND WOOD RESTORATIVE COMPOSITIONS AND METHODS OF USING SAME

[75] Inventors: Roger L. Ely, Corvallis; Marvin B. Langenberg, Springfield, both of Oreg.

[73] Assignee: Research Chemical, Springfield, Oreg.

[21] Appl. No.: 733,987

[22] Filed: May 13, 1985

Related U.S. Application Data

[63] Continuation-in-part of Ser. No. 528,989, Sep. 2, 1983, abandoned.

[51] Int. Cl.[4] .......................... C11D 7/06; C11D 7/52
[52] U.S. Cl. ...................................... 252/158; 134/40; 134/4; 252/156; 252/159; 252/173; 252/174.17
[58] Field of Search ................. 134/40; 252/156, 158, 252/159, DIG. 8, 174.17, 173

[56] References Cited

U.S. PATENT DOCUMENTS

| | | | |
|---|---|---|---|
| 2,827,439 | 3/1958 | Helper | 252/159 |
| 3,410,805 | 11/1968 | Goldsmith et al. | 252/158 |
| 3,529,999 | 9/1970 | Boeniger | 134/2 |
| 4,193,886 | 3/1980 | Schoenholz et al. | 252/90 |
| 4,502,891 | 3/1985 | Brocklehurst et al. | 134/4 |

FOREIGN PATENT DOCUMENTS

| | | |
|---|---|---|
| 915266 | 10/1946 | France . |
| 74800 | 5/1983 | Japan . |
| 113574 | 3/1942 | Sweden . |

*Primary Examiner*—Prince E. Willis
*Attorney, Agent, or Firm*—Chernoff, Vilhauer, McClung & Stenzel

[57] ABSTRACT

Compositions and methods of using the same are disclosed, the compositions being effective for the removal of paints, stains, varnishes, resins, grease, wood pitch, urea and phenolic resins, creosote, and also as a wood restorative. The compositions consist essentially of an aqueous solution of an alkali metal hydroxide, sodium bicarbonate, ethylene glycol, glycerol, and xanthan gum and/or corn starch. Enhanced effectiveness of the compositions is obtained in some cases by further application of a weakly acidic oxalic acid solution. The compositions are applied to the surface having the coating desired to be removed by brushing, spraying, and the like, allowed to stand for a time, then either wiped off or washed off with water, except in the case of creosote removal, where the composition is allowed to dry and then removed by conventional methods.

10 Claims, No Drawings

COATING REMOVER AND WOOD RESTORATIVE COMPOSITIONS AND METHODS OF USING SAME

This is a continuation-in-part of commonly-assigned application Ser. No. 528,989 filed Sept. 2, 1983, now abandoned.

BACKGROUND OF THE INVENTION

This invention relates to a composition and method for removal of both oil- and water-based paints, stains, varnishes, lacquers, clear resins and enamels from interior and exterior surfaces. It also relates to a surface wood restorative composition and to a composition for preparing the surface of old, weather-beaten or water-stained wood to accept a new finish, as well as to methods of accomplishing the same. It further relates to a composition for removing heavy grease and oil buildups, and to a composition for dissolving and removing wood pitch, resin, and creosote deposits, and to methods of accomplishing the same.

Most paint removers on the market today employ toxic petroleum distillates or other volatile agents, such as toluene, methylene chloride, ketones, or acetone as their active ingredient and consequently require great care in handling and applying, including provisions for adequate ventilation.

Another problem with such paint removers is that it is usually necessary to reapply the paint remover several times if one wishes to strip several layers of paint; in other words, often one must effectively apply one layer of paint remover for each layer of paint which is sought to be removed. Moreover, in use, such products tend to dry quickly, thereby causing them to lose their stripping ability and rendering them unsuitable for use on exterior surfaces which are exposed to the elements. This same volatility causes them to be hazardous when exposed to high temperature and open flames. Still other problems associated with such compositions are that they are generally non-biogradable, herbicidal, and often may not be completely removed without the introduction of another solvent.

Removers employing alkaki metal hydroxides and sodium carbonate are well known. See, for example, U.S. Pat. Nos. 1,449,388, 1,581,413, and 1,589,219. However, in addition to suffering from many of the drawbacks noted above, such compositions have tended to burn wood surfaces, to dry too quickly on exterior surfaces, and to be so corrosive as to be extremely hazardous to the user.

A similar situation exists with products currently available for removal of heavy grease and oil buildups and for removal of wood pitch, resin, and creosote deposits. The vast majority of the commercially marketed products intended for these applications also employ toxic petroleum distillates or other volatile agents as their active ingredient and consequently require great care in handling and applying, including provisions for adequate ventilation. The volatility of the active ingredients also causes them to be quite hazardous when exposed to high temperature and open flames. This is especially significant in many industrial settings. These products also generally tend to be non-biodegradable, herbicidal, and require use of another solvent for their complete removal. Alkaline products currently available for removal of heavy grease and oil buildups or for removal of wood pitch, resin, and creosote deposits often suffer from many of the drawbacks noted above, and also tend to be so corrosive as to be extremely hazardous to the user.

In the previously-mentioned commonly-assigned U.S. patent application Ser. No. 528,989, now abandoned, there is disclosed a paint remover/wood restorative composition and method of using the same, the composition comprising an aqueous solution of the following components by approximate weight: 87% water, 7% sodium hydroxide, 0.5% sodium bicarbonate, 0.1% ethylene glycol, 0.1% glycerol, and 5% corn starch. The method of using the composition comprises simply applying the composition to the desired surface, leaving it on the surface for an effective period of time, and then rinsing the composition off with water. The present invention resides in improvements in that composition, improvements in the methods of using the improved compositions, and the discovery of other uses for the improved compositions.

It is therefore an object of this invention to provide inexpensive, nonflammable, biodegradable, and nonherbicidal paint remover and wood restorative compositions which are relatively gentle to use, will remain wet and therefore effective for long periods, and that are suitable and safe for use on interior and exterior surfaces.

It is a further object of the present invention to provide a fast-acting remover which is effective on deteriorated surfaces in a single application and which may be removed either by simply spraying with water or by methods using very little or no water.

It is still another object of the present invention to provide a paint remover composition which is not harmful to wood, which acts as a wood restorative, and which is extremely stable with a long shelf life.

It is a further object of this invention to provide inexpensive, biodegradable, nonherbicidal, and gentle-to-use compositions for the removal of heavy grease and oil buildups, as well as for the removal of wood pitch, resin, and creosote accumulations.

It is still another object of the present invention to provide improved processes for removing oil- and water-based paints, stains, varnishes and resins from any surface and for either renewing or preparing the surface of old, weather-beaten or water-stained wood.

It is a still further object of this invention to provide methods for the safe and effective removal of oil and grease buildups, as well as methods for the safe and effective removal of wood pitch, resin, and creosote deposits.

These and other objects are accomplished by the compositions of the present invention and by the methods of using the same, all of which are described more particularly below.

SUMMARY OF THE INVENTION

There are several aspects to the present invention. One aspect comprises two different aqueous compositions, the essential ingredients of which are an alkali metal hydroxide, sodium bicarbonate, glycerol, ethylene glycol, and xanthan gum.

The compositions thus provided can be easily and safely applied with a brush, roller or spray. One of the two compositions will remove multiple layers of deteriorated oil- and water-based paints, heavy-bodied stains, varnishes, and clear resin finishes without reapplication in two hours or less. The other of the two compositions will restore old, weathered wood to like-new appearance and will remove semi-transparent stains, both in an hour or less and without reapplication. Both compositions may be easily and safely washed off with water as they are fully water soluble, nonherbicidal, and biodegradable. Both compositions can also be removed by essentially waterless means, such as a spatula, rag, or sponge, which feature is particularly important for interior applications.

The compositions of the present invention will not damage wood surfaces in any way other than an occasional darkening effect; in fact, a rather surprising quality is that they actually restore old wood which has been water-stained, weather-beaten, or rust-stained, and gives it a new-wood look, thus functioning both as a wood restorative composition and a composition for preparing such wood to accept new finishes.

The coating removal and restorative compositions of the present invention comprise aqueous compositions, the essential ingredients of which are an alkali metal hydroxide, sodium bicarbonate, glycerol, and ethylene glycol. Xanthan gum may be added in various amounts to achieve a thickening action as appropriate for the specific use and method of application. A foaming agent such as the reaction product of nonyl phenol and ethylene oxide and/or a stabilizing agent such as the condensation reaction product of ethylene oxide and coconut fatty acid monoethanolamide may also be added to enhance clinging ability to vertical surfaces and to enhance penetration of certain coatings.

Another aspect of the present invention is the use of a second, weakly acidic, oxalic acid composition in conjunction with the paint remover and wood restorative compositions disclosed herein, the use of such an acidic composition greatly enhancing the removal and restorative properties of such compositions.

The compositions thus provided can be easily and safely applied by a number of methods, including brush, roller, and sprayer, will soften and remove heavy grease or oil buildups, wood pitch, urea and phenolic resins, and creosote deposits, and may be easily and safely washed off with water as they are fully water soluble, nonherbicidal, and biodegradable. And, as mentioned above, the compositions can also be removed by essentially waterless means, for example, with a resilient spatula, rag, or sponge.

DETAILED DESCRIPTION OF THE INVENTION

The preferred embodiments of the compositions of the invention consist essentially of aqueous solutions of the ingredients noted below in the following approximate weight percentages:

|  | Paint Remover | Wood Restorative and Stain Remover | Oil and Grease Remover | Wood Pitch, Resin, and Creosote Remover |
|---|---|---|---|---|
| Alkali Metal Hydroxide | 7.0% | 4.7% | 7.0% | 10.0% |
| Sodium Bicarbonate | 0.5% | 0.5% | 0.5% | 0.5% |
| Ethylene Glycol | 1.0% | 1.0% | 1.0% | 1.0% |
| Glycerol | 0.1% | 0.1% | 0.1% | 0.1% |
| Xanthan Gum | 1.0% | 1.0% | 0.9% | 0.7% |

The compositions of the present invention are prepared by combining and vigorously mixing the above ingredients in a container at ambient temperature and pressure.

Although 4.7% by weight alkali metal hydroxide such as sodium or potassium hydroxide is preferred for the wood restorative composition, any amount between about 1.5% and 5% will do. Compositions with less than about 3.5% to about 4% by weight alkali metal hydroxide have been found to be effective purely as a wood restorative, whereas compositions with between about 3.5% to about 4% and about 4.5% to about 5% by weight alkali metal hydroxide can function both as a wood restorative and as a semi-transparent stain remover, respectively. Compositions containing about 5% to about 15% by weight alkali metal hydroxide have been shown to be effective as a paint remover, although about 7% is preferred for most uses.

Compositions consisting essentially of the same formulation as for the paint remover have been found to be effective as a grease and oil remover. As with the paint remover, the amount of alkali metal hydroxide can be varied from about 5% to about 15% by weight, depending on the intended use. The amount of xanthan gum may be reduced slightly to provide a less viscous formulation.

Removal of wood pitch, resin, and creosote sometimes requires more alkali metal hydroxide, but again the content can vary from about 7% to about 15% by weight while still achieving satisfactory results. With increased alkali metal hydroxide concentration, the amount of xanthan gum must be reduced to control gelation tendencies.

For all of the compositions described above, test results show sodium hydroxide and potassium hydroxide to function equally well. They may be considered to be interchangeable, or they may be used in combination. Also, it has been found that the amount of ethylene glycol and glycerol present in the compositions can be increased or decreased somewhat and the compositions will still function satisfactorily in some situations. If the ethylene glycol and/or the glycerol is/are eliminated completely, the compositions tend to dry more quickly and lose some of their penetrating ability. If either or both of these ingredients is increased substantially, hydration reactions of the xanthan gum become greatly retarded. Therefore, while the stated amounts are preferred, amounts from about 0.1% up to about 5.0% by weight ethylene glycol and from about 0.05% to about 1.0% by weight glycerol may be employed with varying degrees of success.

In the previous commonly-assigned application mentioned, about 5% by weight corn starch was used as a thickening agent. Although corn starch is useful as a thickening agent, and may be used in addition to or in lieu of the xanthan gum component of the present invention, xanthan gum is preferred as it adds substantial shelf life to the compositions.

Although 0.7 to 1% by weight xanthan gum is preferred, any amount between about 0.2% and about 3% will do, depending upon the specific intended use. For some uses, a composition containing only about 0.2% xanthan gum is especially effective when used with a spray apparatus such as a pistol-grip sprayer. The function of xanthan gum is as a thickener and a stabilizer, more than tripling the shelf life of the compositions disclosed in the previously-mentioned commonly assigned application. It also imparts an improved adhering quality to the compositions so that they tend to better adhere to vertical and sloped surfaces. The preferred xanthan gum is made by Pfizer Chemical Co. and sold under the name Flocon S.

The compositions of the present invention work equally well on virtually any surface, including wood, metal, stucco and brick. On extremely hot days or when otherwise exposed to high temperatures, if the compositions of the present invention dry out and become inactive, they can simply be misted with water and thus reactivated without requiring application of another coating. Even without reactivation by rewetting, the compositions will remain wet and active for one to two hours even in summer. This makes the compositions well suited for removal of multiple layers of paint or heavy buildups of grease, wood pitch, resin, or creosote over long periods of time under hot, dry conditions.

The remover compositions are applied to the surface from which one desires to remove paint, stain, varnish, grease, oil, wood pitch, resin, or creosote by simply applying with a brush, roller or by spraying. The composition begins to act on deteriorated finishes or coatings almost immediately. Based upon field tests, typical times for treatment of surfaces or for removal of various types of coatings were as follows:

| Composition and Coating | Removal Time |
| --- | --- |
| Wood Restorative Composition | |
| Bare, weathered wood | 1 to 15 min |
| Semi-transparent oil wood stain | 5 to 45 min |
| Semi-transparent latex wood stain | 5 to 60 min |
| Paint Remover Composition | |
| Flat latex paint | 15 to 120 min |
| Latex enamel | 20 to 120 min |
| Oil-based house paint | 15 to 60 min |
| Oil-based enamel (other than gloss) | 15 to 60 min |
| Oil-based enamel (gloss) | 30 to 120 min |
| Heavy-bodied latex wood stain | 10 to 60 min |
| Solid-bodied oil wood stain | 10 to 40 min |
| Iron oxide primers | 30 to 120 min |
| Grease Removal Composition | 30 min to 4 hrs |
| Bunker C (No. 6 residual) oil buildup on machinery surfaces | |
| Wood Pitch, Resin, and Creosote Removal Composition | |
| Wood Pitch | 10 min to 2 hrs |
| Urea or Phenolic Resin | 30 min to 24 hrs |
| Creosote | 6 hrs to 24 hrs |

The compositions of the present invention often have been found to actually dissolve the paint, stain, grease, wood pitch, resin, or creosote sought to be removed rather than stripping it off layer by layer. In some instances, the compositions penetrate the coating and attack the bond between the coating and the underlying surface, allowing the coating to be easily removed. This means that a single application is typically enough to completely remove several layers of coatings on a surface. The reaction product of the compositions and the dissolved coating is water-soluble and so may be removed by simply washing with water; since it is non-herbicidal and fully biodegradable, it may be washed directly onto lawn or other shrubs with no adverse consequences. In interior areas, or other areas where washing with water is not practical, the compositions may be removed with a resilient spatula, putty knife, rag, or sponge, thus requiring essentially no water.

Since the by-product of the paint remover composition of the present invention and a paint or stain is water-soluble, the invention is also ideal for use as a paint brush or roller cleaner and restorer. The paint brush or roller can simply be soaked in the paint remover composition until all paint is removed. The brush or roller can then simply be rinsed with water.

The paint remover composition of the present invention has been found to be especially useful in removing deteriorated coatings from aluminum surfaces and, concurrently, aiding in preparation of the surface for a new coating by etching the surface. The composition has also been shown to be effective in etching epoxy-painted surfaces in preparation for re-coating.

The paint remover composition has also been found to be effective for a variety of industrial uses, including: removal of hard lime-dust buildups (4 to 24 hours); removal of asphalt lumps and splashes from equipment (1 to 2 hours); removal of road tar (20 minutes to 2 hours); removal of fungi, algae, and moss from hard surfaces (10 minutes to 1 hour); removal of pulp and paper industry black liquor deposits (10 minutes to 2 hours); and removal of resin glues (4 to 24 hours). The composition is applied to the coating to be removed, allowed to remain on the coating for the stated period of time, and then removed by washing with water or by essentially waterless methods.

The action of the paint remover composition of the present invention is enhanced considerably by the application of a second, weakly acidic composition to the surface following treatment with the remover composition. The acidic composition comprises an aqueous solution of oxalic acid, containing from approximately 2% to approximately 6% by weight of the acid. The oxalic acid solution may be applied by any convenient means, such as a brush, roller or sprayer, and may be allowed to remain on the surface indefinitely, or may be rinsed off with water after a period of at least 20 to 30 minutes.

The wood restorative composition acts to restore a new-wood look to the surface of old, weather-beaten or water-stained wood and so prepare the surface for a new finish by simply applying it by brushing, rolling or spraying on the surface and allowing it to remain for about 1 to 15 minutes, then hosing it off with water. Because the composition does not damage the surface of the wood other than an occasional darkening effect, it may be allowed to remain on the surface for up to an hour or two without adverse effects.

An even brighter new-wood look is obtained by applying a second, weakly acidic composition to the surface following treatment with the above wood restorative composition, the acidic composition acting to remove any darkening caused by the alkaline wood restorative composition. The acidic composition in this case also comprises an aqueous solution of oxalic acid, containing from about 2% to about 6% by weight of the acid and may be applied and removed in the same manner as previously described.

The grease removal composition is particularly effective in dissolving and removing heavy buildups and/or multiple layers of stubborn greasy or varnish-like residues that have been resistant to other removal methods. The composition may be applied by brushing, wiping, rolling, or spraying on the surface. For large and/or irregularly shaped surfaces, spraying has proven to be especially effective and convenient. After a period of from about 30 minutes to about four hours, the compositions may be removed, along with the dissolved or softened grease buildup, by hosing it off with water. A high-pressure water spray is especially quick and effective for removing the composition. As discussed previously for the paint removal composition, the grease removal composition may also be removed by waterless means such as wiping. Because the composition is nonflammable, nonherbicidal, and relatively gentle to use, it is much safer in certain industrial environments than solvent cleaners or harsh caustic cleaners.

Similarly, the wood pitch and resin removal composition is quite effective in dissolving and removing stubborn buildups or coatings of wood pitch or resins. As described above, the composition may be applied by brushing, wiping, rolling, or spraying on the surface. After a period of from about 10 minutes to about 24 hours, depending on the specific application, the composition may be removed by spraying with water or by using waterless methods. Using the composition on heated surfaces, such as veneer plant wood driers, has been shown to be especially effective for removal of pitch and wood resin buildups.

This composition has also been shown to be effective in removing even glazed, burned-on creosote deposits from chimneys. This type of creosote is referred to in the chimney-cleaning trade as "third-degree" creosote, and is nearly impossible to remove using methods currently available. The composition is applied to the creosote deposit by any convenient means, such as spraying, and allowed to completely dry. The entire chimney, including the most difficult third-degree creosote deposits, can then be easily cleaned using standard methods.

The compositions of the invention have the advantages of having a water base and containing no volatile constituents. Consequently, they are nonflammable and nonvolatile and suitable for use around heat or flames without danger of explosion or fire. Because they give off no harmful vapors, they can be used safely in closed areas and/or at high temperatures. In fact, the speed of the action of the compositions of the present invention can be enhanced by raising the temperature of either the composition, the environment, or the surface being treated. In addition, the compositions are extremely stable, with an indicated shelf life of in excess of two years.

The terms and expressions which have been employed in the foregoing specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A nonflammable, biodegradable, nonherbicidal composition for the removal of oil- and water-based paints, stains, varnishes, and clear resins consisting essentially of an aqueous solution of the following components, by approximate weight: 5 to 15% alkali metal hydroxide, 0.5% sodium bicarbonate, 0.1 to 5% ethylene glycol, 0.05 to 1% glycerol, and 0.2 to 3% xanthan gum.

2. A surface wood restorative composition consisting essentially of an aqueous solution of the following components, by approximate weight: 1.5 to 5% alkali metal hydroxide, 0.5% sodium bicarbonate, 0.1 to 5% ethylene glycol, 0.05 to 1% glycerol, and 0.2 to 3% xanthan gum.

3. A composition for preparing the surface of old, weather-beaten or water-stained wood for a new finish, the composition consisting essentially of an aqueous solution of the following components, by approximate weight: 1.5 to 5% alkali metal hydroxide, 0.5% sodium bicarbonate, 0.1 to 5% ethylene glycol, 0.05 to 1% glycerol, and 0.2 to 3% xanthan gum.

4. A grease and oil remover composition consisting essentially of an aqueous solution of the following components, by approximate weight: 5 to 15% alkali metal hydroxide, 0.5% sodium bicarbonate, 0.1 to 5% ethylene glycol, 0.05 to 1% glycerol, and 0.2 to 3% xanthan gum.

5. A wood pitch and resin removal composition consisting essentially of an aqueous solution of the following components, by approximate weight: 7 to 15% alkali metal hydroxide, 0.5% sodium bicarbonate, 0.1 to 5% ethylene glycol, 0.05 to 1% glycerol, and 0.2 to 3% xanthan gum.

6. A composition for cleaning and restoring paint applicators consisting essentially of an aqueous solution of the following components, by approximate weight: 5 to 15% alkali metal hydroxide, 0.5% sodium bicarbonate, 0.1 to 5% ethylene glycol, 0.05 to 1% glycerol, and 0.2 to 3% xanthan gum.

7. A composition for etching aluminum and epoxy-coated surfaces to aid in preparing the surface for application of a new coating, the composition consisting essentially of an aqueous solution of the following components, by approximate weight: 5 to 15% alkali metal hydroxide, 0.5% sodium bicarbonate, 0.1 to 5% ethylene glycol, 0.05 to 1% glycerol, and 0.2 to 3% xanthan gum.

8. A composition for removing lime dust, asphalt, fungi, algae, moss, pulp mill black liquor, and resin glue, the composition consisting essentially of an aqueous solution of the following components by approximate weight: 5 to 15% alkali metal hydroxide, 0.5% sodium bicarbonate, 0.1 to 5% ethylene glycol, 0.05 to 1% glycerol, and 0.2 to 3% xanthan gum.

9. The composition of claim 1, 2, 3, 4, 5, 6, 7 or 8, including a foaming agent.

10. A biodegradable non-herbicidal composition for the removal of oil- and water-based paints, stains, varnishes, and clear resins at ambient temperatures consisting essentially of the following components, by approximate weight: 87% water, 7% sodium hydroxide, 0.5% sodium bicarbonate, 0.1% ethylene glycol, 0.1% glycerol, and 5% corn starch.

* * * * *